US009583320B2

(12) United States Patent
Krumwiede

(10) Patent No.: US 9,583,320 B2
(45) Date of Patent: Feb. 28, 2017

(54) METHOD FOR QUANTITATIVELY IDENTIFYING A SUBSTANCE BY MASS SPECTROMETRY

(75) Inventor: Dirk Krumwiede, Bremen (DE)

(73) Assignee: Thermo Fisher Scientific (Bremen) GmbH, Bremen (DE)

(*) Notice: Subject to any disclaimer, the term of this patent is extended or adjusted under 35 U.S.C. 154(b) by 369 days.

(21) Appl. No.: 13/061,755

(22) PCT Filed: Aug. 21, 2009

(86) PCT No.: PCT/EP2009/006058
§ 371 (c)(1),
(2), (4) Date: Mar. 2, 2011

(87) PCT Pub. No.: WO2010/025834
PCT Pub. Date: Mar. 11, 2010

(65) Prior Publication Data

US 2011/0165694 A1 Jul. 7, 2011

(30) Foreign Application Priority Data

Sep. 5, 2008 (DE) ........................ 10 2008 046 139

(51) Int. Cl.
*G01N 24/00* (2006.01)
*H01J 49/00* (2006.01)

(52) U.S. Cl.
CPC ......... *H01J 49/0027* (2013.01); *Y10T 436/24* (2015.01)

(58) Field of Classification Search
None
See application file for complete search history.

(56) References Cited

U.S. PATENT DOCUMENTS 7,427,752 B2 9/2008 Jones et al.

FOREIGN PATENT DOCUMENTS

DE 203 16 798 U1 5/2004
EP 1 170 779 A1 1/2002
WO WO 2004/047143 * 6/2004 ............. H01J 49/32

* cited by examiner

*Primary Examiner* — Robert Xu
(74) *Attorney, Agent, or Firm* — Nicholas Cairns; Charles B. Katz

(57) ABSTRACT

The invention relates to a method for the quantitative determination of a chemical substance S from a sample using a mass spectrometer having at least one detector. In line with the invention, a sample which may contain the substance S of interest, or a conversion product of the sample, is analyzed in the mass spectrometer. For the analysis the mass spectrometer is alternately set at least for masses SM1, SM2, so that each of the masses is detected multiple times and all of said masses are detected by the same detector. The masses SM1 and SM2 are fictitious neighboring masses for a mass CM of the substance S with a particular isotope content. The quantity of the mass CM is ascertained by means of calculation from the measured values for the masses SM1, SM2.

13 Claims, 13 Drawing Sheets

METHOD FOR QUANTITATIVELY IDENTIFYING A SUBSTANCE BY MASS SPECTROMETRY

FIELD OF THE INVENTION

The invention relates to a method for the quantitative determination of a chemical substance S by mass spectrometry.

BACKGROUND

By way of example, quantitative analyses are performed in order to determine toxic or otherwise undesirable substances, such as halogen compounds. In this case, the aim is to ascertain the proportion of a particular substance—or substance class—within a sample, for example in micrograms per gram (=ppm) or nanograms per gram (=ppb).

The sample or a conversion product thereof can be temporally resolved using a chromatographic method, so that the sought substance in the eluate is in available at the outlet of the chromatographic device for analysis by mass spectrometry.

The mass spectrometer may have the usual design, namely with an inlet system, an ion source, a mass analyzer, a detector and a data system. The eluate from the chromatographic method is supplied to the inlet system of the mass spectrometer.

It is also possible to perform mass spectrometric analysis without a preceding chromatographic method. This frequently results in a greater level of uncertainty in the results. The sample or a conversion product thereof is supplied, directly to the inlet system of the mass spectrometer.

Numerous substances in an organic sample—such as pollutants, valuable nutrients or other target substances—have complex molecular structures with mass-to-charge ratios of more than 100 or more than 250, in particular. Depending on the elements contained, each substance has its own characteristic isotope pattern. It is therefore possible for the mass spectrometer to be used to detect various masses with a different respective isotope content for the same substance. In this case, the various masses of the same substance are in a relatively constant ratio with one another which is characteristic of said substance. It is therefore also possible to take the quantitative determination of a single target mass or of few target masses of the sought substance and to determine said substance quantitatively overall.

For the substances which are sought, the isotope patterns and accordingly also the various (exact) masses and the proportions thereof are known generally. The user knows what he is looking for and can therefore use the known isotope pattern to choose the masses of the sought substance which are able to be detected best.

An example of the method on which the invention is based and the methodology relating thereto are described in a document from the US environmental authority EPA (Environmental Protection Agency). The document is available on the Internet at http://www.epa.gov/region03/1613.pdf. It explains the quantitative determination of specific dioxins and furans by isotope dilution in conjunction with gas chromatography and mass spectrometry. The document and the method disclosed therein are cited as EPA 1613.

The principle of the isotope solution technique is that one or more "internal standards" (i.S.) are added to a sample before the further conditioning. These are usually isotope-marked by substitution of all C atoms for 13C isotopes. In this case, the internal standard is thereby 12 units of mass heavier than the analyte referred to as "native". The known admixture of the internal standard with the sample can be used to determine the content of the sought "native" analyte in the sample by forming a ratio between the measured value for the "native" analyte and the measured value for the internal standard. Normally, the most toxic dioxins are added as the internal standard and directly quantified by means of comparison. In addition, further dioxins found or fragments thereof which are formed in the ion source are frequently quantified simply as a sum. If appropriate, further standards are added after the sample conditioning in order to quantify the efficiency of the sample conditioning.

The invention is not limited to the determination of the cited pollutants. In principle, it is possible to determine any target substances contained in a sample using the method according to the invention.

Besides the substance which is being sought, the sample normally contains further known or unknown substances. The masses and dwell times thereof may be close to those of the substance which is being sought. The measured values for the selected masses of the sought substance can therefore be distorted by interference with other parts of the sample.

Interference between adjacent masses is visible during mass spectrometric analysis depending on the resolution of the mass spectrometer and the peak width of the respective mass. The area below the peak of the analyzed mass is a measure of the quantity of sample containing said mass. If a peak for an adjacent mass now coincides with the peak of the selected mass of the sought substance, the result is an excessive measured value for the selected mass of the sought substance, since for the selected mass not only the ions of the sought substance but also ions of the adjacent mass are included in part. The user usually does not know beforehand whether such interference is present and how great the interference is. This applies to appliances with only one detector as well as to multicollector mass spectrometers with a magnetic sector.

In order to prevent interference and hence to confirm an expected isotope pattern, it is sufficient for many applications if the ratio of two dominant mass peaks relative to one another is determined. At the same time, the target substance is often quantified only using one of the two mass peaks. For this reason, it is usual to refer to one mass (one mass peak) as the quantification mass QM and to the other mass (the second mass peak) as the comparison mass RM. This type of nomenclature is also used subsequently if appropriate for reasons of clarity. Naturally, it is possible and in many cases also expedient for both masses QM and RM to be used for the quantification. Accordingly, the terms "quantification mass QM" and "comparison mass RM" are not intended to restrict the scope of protection of the invention.

In order to detect the interference, DE 103 51 010 A1 (corresponding to WO 2004/047143) discloses the practice of splitting an ion beam into two separate ion beams using a reflecting electrode in the direction of the mass dispersion. The separate ion beams formed in this manner are directed at two separate detectors. If the signals from the two detectors differ significantly, the ion beam (before the split) has interference ions. This method requires additional hardware, namely the reflecting electrode and an additional detector. It is also necessary for the additional electrode to be aligned extremely precisely in order to ensure clean and even splitting of the ion beam. The two detectors need to be calibrated to one another. In addition, the division of the ion beam and the division ratio are permanently present.

SUMMARY

It is at object of the present invention to provide a simpler and more flexible method, particularly without the need for additional hardware.

The method according to the invention has the features of claim 1.

It is self-evident that the main field of application of the invention is directed mass analysis. Typical measurement methods are referred to as "MID" (multiple ion detection) or "SIM" (single ion monitoring). These kinds of measurements do not involve a "mass scan" being performed during the measurement. Instead, the spectrometer is alternately set for the expected target masses with a particular resolution and for a particular time. The resultant value of the time-based integral over the observed, mass is used for the quantification. To allow this, it is usually necessary to perform calibration measurements before quantitative measurements are taken. Furthermore, the shape of the mass peak is usually determined and optimized, either before the measurement or by the actual manufacturer of the measuring instrument.

For the quantitative analysis, the quantity of the target mass M0 at the mass position PM0 (as one of a plurality of possible masses for the substance S) is ascertained. The quantity of the mass M0 is either measured directly or calculated from other measured masses. The mass M0 can be selected arbitrarily by the user with knowledge of the composition or of the isotope pattern of the substance S. The width and shape of the mass peak are dependent on the instrument and can be determined by calibration methods.

In the simplest embodiment of the method, an intensity IM0 for the mass M0 at the position PM0 is calculated. Positions PM1 and PM2 of fictitious neighboring masses M1 and M2 situated at defined distances D1 and D2 next to the mass position PM0 are measured. To this end, the mass analyzer is alternately set for the masses M1 and M2, namely for the mass positions PM1 and PM2, so that each of the masses is detected at least once or even multiple times by the same detector.

The mass settings DM1 and PM2 are direct neighbors of PM0, with DM1 relating to a heavier mass M1 and PM2 relating to a lighter mass M2 than M0, for example. A distance DM1 from DM1 to PM0 is preferably the same as a distance DM2 from PM2 to PM0. The measured values for the mass settings DM1 and PM2 at known distances DM1, DM2 from PM0 can be used to calculate the intensity IM0 of the target mass. The distances D1, D2 are less than the peak width of the mass M0. Preferably, the distances D1, D2 each amount to the half peak width of the mass M0 at half peak height.

Generally, it is possible to define a relationship $$x \cdot \mathrm{IM1} + y \cdot \mathrm{IM2} - z \cdot \mathrm{IM0} = 0$$

for prescribed distances DM1, DM2, where IM1, IM2, IM0 are the measured intensity at the respective mass position and the parameters x, y, z are stipulated by consideration, calibration or observation.

The peak width at half maximum and other details of the peak shape can be ascertained in the scan mode of the mass spectrometer using the peak of the setting PM0, for example. To the left and right of the maximum of the measured value (peak tip), relatively low intensities are naturally obtained. As soon as these amount to half of the value of the peak maximum, it is possible to read off the peak width at this point from the peak shape. The peak width ascertained in this manner at half peak height is referred to as FWHM (full width at half maximum). Half of this value can be used as the "half peak width" HWHM (half width at half maximum) and respectively as DM1 and DM2 for the further calculations.

Other settings are possible, e.g. the mass setting PM1 such that the resultant intensity at this setting is 25% or 33%, for example. To simplify, the description below predominantly assumes the preferred case, however, in which the intensities of the "split masses" M1, M2 (at the positions PM1, PM2) are 50% of the intensity of the peak maximum.

Various statements can be derived from the measured values IM1, IM2 for the mass positions PM1 and PM2. It is subsequently assumed that the settings PM1 and PM2 have been chosen such that the resultant intensities give 50% of the intensity IM0 at the mass setting PM0. For an ideal measuring instrument, this means that the mass offset from PM1 to PM0 is exactly the same size as from PM0 to PM2. Provided that the measured values IM1, IM2 for PM1 and PM2 match, there is a high probability of there being no interfering mass in the neighborhood, of the mass M0. The intensity of the mass M0 is obtained—for a distance from the masses M1, M2 based on the half peak width—from IM1+IM2 or twice IM1 or twice IM2. A measured value for the target mass M0 is in this case not necessarily needed, since the circumstances for the interference-free normal case are known from earlier calibration measurements.

The measurement accuracy for the summed signal (IM1+IM2) is usually the same as for IM0 in this case if the measurement times for PM1 and PM2 are each as long as for PM0. If the values for IM1 and IM2 differ from one another significantly, interference is present. The level of significance can be stipulated empirically or arbitrarily. It can be assumed that interference ions are present on the side with the higher value. The lower value can then be used solely for calculating the most probable intensity IM0 of the mass M0. In this case, the measurement accuracy is reduced to the limitations of the individual measurement with usually half the data capture time.

To align and check the measurement results for a quantification mass QM of the substance S for possible interference ions, a target comparison mass RM for the same substance S can be used. In many applications (for example see EPA 1613), this is the standard method for validating a measurement as "valid" or otherwise. In the case of this known method, a measurement peak is deemed "valid" if the ratio of the masses QM and RM is within an expected (and tolerated) bandwidth.

The invention improves the reliability of this evaluation method by adding an interference measurement within a single mass peak. If, by way of example, a measurement needs to be rejected on account of the assessment of intensities IR0 and IQ0 the masses RM and QM) solely at a given resolution, the measurement can nonetheless still be verified by means of measurement at the mass settings PM1 or PM2 for the case of interference on lust one side of the peaks for QM or RM. In this case, the ratio of IQ1 (the intensity measured at the position P1 for QM) to IR0 (the intensity measured at the position P0 for RM), for example, may still be within the expected bandwidth and can be used for quantifying the target substance.

In this case, the mass spectrometer for analyzing the substance S is alternately set at least for the neighboring masses P1, P2 of the quantification mass QM and for the comparison mass RM, so that each of the masses is detected at least once or even multiple times by the same detector. A measured value IR0 for the mass RM is then taken into account in the further method.

It is conceivable for there to be interference ions on both sides, in different sizes or even in the same size. In order to prevent this instance from resulting in incorrect assessment, the lower value from IQ1 and IQ2 is compared with the value IR0. A setpoint value for the ratio of IQ0 to IR0 is known. Accordingly, a setpoint value for the ratios IQ1 to IR0 and IQ2 to IR0 can be calculated. In event of discrepancies between the measured values and the setpoint values, it can be assumed that interference ions are present and that t respective examined measured value is unsuitable for the intended quantitative determination. If the expected isotope ratio cannot be confirmed, the user needs to sidestep to other masses (other isotopes) of the sought substance S. The risk of having to do this is reduced by the present invention.

It is possible for the value for the mass RM also to be disturbed by interference ions. In this case too, an unexpected ratio would be obtained for IR0 to IQ0, IQ1 or IQ2, so that in that case the measured value IR0 or all the measured values are rejected as unsuitable.

It is also possible for the interference in the region of the mass RM, on the one hand, and in the region of the mass QM, on the other hand, to be so great that said instances of interference cancel one another out or are not apparent when said mass is compared. Either this extremely unusual case is accepted as a risk, of uncertainty for the quantitative determination or a third mass (with different isotopes) for the same substance is concomitantly analyzed and compared with the other masses, or the invention is also applied to the peak of the mass RM.

The case in which the value IQ1 or IQ2 is influenced by interference ions, but not IQ0, is also possible. That is to say that the value IQ0 would be able to be used as a result for the further calculation, which cannot be taken from the values IQ1 and IQ2, however. It is therefore likewise expedient to check IQ0 to IR0. If this ratio is correct then IQ0 can be used, even though IQ1 to IQ2 leads one to suspect interference. In this case, the rather theoretical case that IQ0 and IR0 are equally distorted by interference is accepted.

Advantageously, the sample or a conversion product of the sample is temporally resolved using a chromatographic method before the analysis. The effect achieved by this that only substances having similar properties (such as molecular size, acid content, affinity to nonpolar substances, etc., depending on the type of chromatography) enter the inlet system of the mass spectrometer during a defined period. The number of possible instances of interference with the substance S is drastically reduced. The chromatographic method increases the overall involvement in terms of equipment and time, however. Preferably, a gas chromatography method is used.

Depending on the extent of the available sample, the speed of the chromatography and the required detection limit, it is possible for further masses to be detected and compared or for longer or more measurement cycles to be scheduled.

It is known and also customary in principle to perform calibration measurements before the quantification measurements described above. In this case, known quantities of quantization standards are measured and the appliance response function is determined:

$$\text{Appliance measured value} = f(\text{known quantity of a quantitation standard})$$

Typically, the calibration curve produced by measuring various known quantities is assumed to be a straight line. Advantageously, the invention is already used for determining said calibration curve, but not so much for isolating interference, rather, in particular, also to allow the intensities of the various measured positions to be used directly for the quantification. For the known quantities of quantization standards, it is thus possible to measure not only the exact masses of these standards but also the respectively adjacent masses ("spit masses"). The calibration allows quantity indications to be directly associated with the measured intensities of the adjacent masses during the subsequent quantification measurement.

Different mass spectrometers can be used for carrying out the method. Preferred are sector field mass spectrometers having a magnetic sector or double focusing mass spectrometers having a magnetic and an electrical sector. Preferably, a mass spectrometer is used which has at least one electrical sector, the electrical field of which is set specifically for selecting the masses which are to be examined. However, it is also possible to adjust a magnetic sector for mass selection.

Finally, it is also possible to use quadrupole mass spectrometers. In a quadrupole mass spectrometer, the transferred mass-to-charge ratio is dependent on the stability of the ion motion in a radio-frequency field. Ions which do not satisfy the conditions for a stable trajectory are lost before they reach a detector. There is no division of the ion beam by an outlet slot. The resolution is dependent on the radiofrequency and on the direct current on the quadrupole bars and on various geometrical factors of the equipment. The resolution is frequently no better than a particular limit value, but the method according to the invention can be used to eliminate interference.

Since the concept of the invention is easier to understand in connection with a spectrometer having a mass-dispersed ion beam, most examples and outlines relate to double focusing sector field mass spectrometers.

Advantageously, precisely one detector having an inlet opening or a detector inlet gap is provided. Calibration of different detectors to one another is then dispensed with. Alternatively, it is possible to use a plurality of detectors, each with one or more inlet openings, or to use one detector having a plurality of inlet openings.

There is no provision for the method according to the invention to be limited to particular ion sources. In principle, it is possible to use all kinds of ion sources/ionization methods in connection with the method according to the invention, for example the following:

a) an electron impact (EI) ion source,
b) a chemical ionization (CI) ion source,
c) a field ionization (FI) ion source,
d) a field desorption (FD) ion source,
e) a fast atom bombardment (FAB) ion source,
f) an atmospheric pressure ionization (API) ion source,
g) a laser desorption (LDI) or matrix-assisted laser desorption/ionization (MALDI) ion source,
h) a photoionization (PI) ion source,
i) an electrospray (ESI) ion source,
j) a thermospray (TSI) ion source,
k) a plasma desorption (PDI) ion source,
l) a secondary ion (SIMS) ion source,
m) a thermal desorption (TD) ion source,
n) as inductively coupled plasma (ICP) ion source.

Electron impact ionization (EI) is particularly preferred.

The invention also relates to a method for analyzing a sample, particularly for identifying and/or quantifying a substance using a mass spectrometer, wherein at least one selected mass is intended to be examined using the mass spectrometer. In line with the invention, the mass spectrometer is set, in addition or as an alternative to the selected mass, at least for an adjacent mass, wherein the adjacent mass is preferably at a distance of no more than the full peak width of the selected mass from the selected mass. The method according to the invention can be used to increase the effective resolution, at least when no interference is present or to be expected in the region of the adjacent mass. Any interference which is present for the selected mass, namely opposite the adjacent mass, is masked out by the method according to the invention, so that the effective resolution is sufficient for separating the selected mass from the interfering mass. The method according to the invention relates particularly to a mass spectrometer in step mode, in which various masses are selected by adjusting a sector field. The preferred distance between the adjacent mass and the selected mass is obtained particularly from the peak width of the selected mass. For the peak width, there are various definitions. In this case, the peak width at half maximum, known as FWHM, is preferred but cannot be used on its own. The method according to the invention can be used particularly advantageously in conjunction with a distance which is shorter than the value FWHM. A distance corresponding to the half peak width HWHM is preferred.

The invention also relates to the use of the previously described methods according to the invention for the analysis of substances with interference on one side of the sought mass. These are particularly methods in which the examined substance and the sought mass are known. The intention is to quantify the sought mass, for example in order to determine a pollutant content in a sample. Advantageously, the methods are used for the analysis of substances in which interference is expected or known only on one side or on precisely one side of the sought mass.

Finally, the invention also covers the use of one of the aforementioned methods for the analysis of halogenated compounds, particularly for the analysis of dioxins and/or furans. Directly detectable masses of these substances often have interference only on one side.

BRIEF DESCRIPTION OF THE DRAWINGS

Further features of the invention can be found in the description in other respects and in the claims. Exemplary embodiments of the invention are explained in more detail below with reference to drawings, in which:

DETAILED DESCRIPTION OF ILLUSTRATIVE EMBODIMENTS

Figure 1:
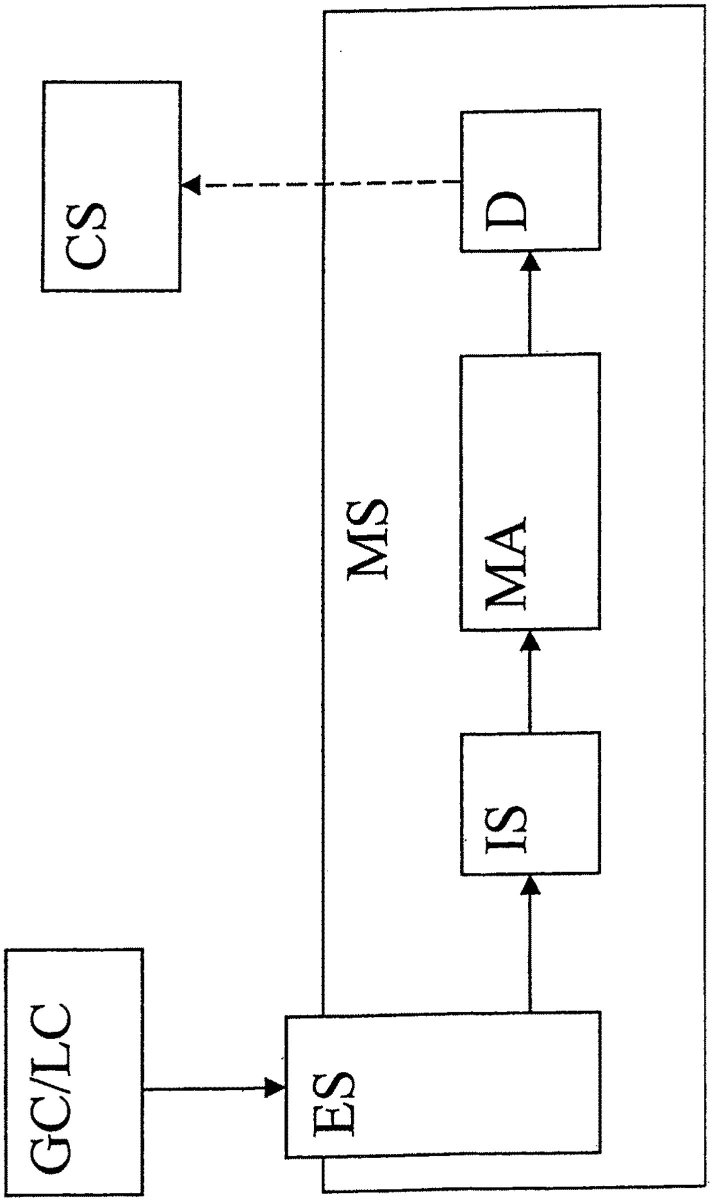
FIG. 1 shows a simplified illustration of an apparatus for carrying out the method according to the invention, namely a mass spectrometer having an upstream gas chromatograph and a connected computer system for evaluating the accruing data.

In order to carry out the method according to the invention, a mass spectrometer MS is used in this case which, as shown in FIG. 1, may be of customary design, namely with an inlet system ES, an ion source IS, a mass analyzer MA and a detector D. Upstream of the inlet system ES is a device for chromatographic separation, for example a gas chromatograph GC or a liquid chromatograph LC. The signals arising on the detector D are processed and conditioned by a computer system CS. Preference is given to an implementation with a gas chromatograph GC, an EI ion source, a double focusing mass analyzer and a detector with an inlet gap.

What is intended to be examined is a particular pollutant content in a food sample, for example. The food sample is pretreated in a known manner. The ingredients are temporally resolved in the gas chromatograph GC, so that with a particular dwell time a target substance (pollutant) is predominantly supplied to the inlet system ES. Typically, the target substance is known and only the quantity thereof needs to be determined. An example of this inherently known method is cited in EPA 1613. Reference is hereby made to this document in its entirety.

Figure 2:
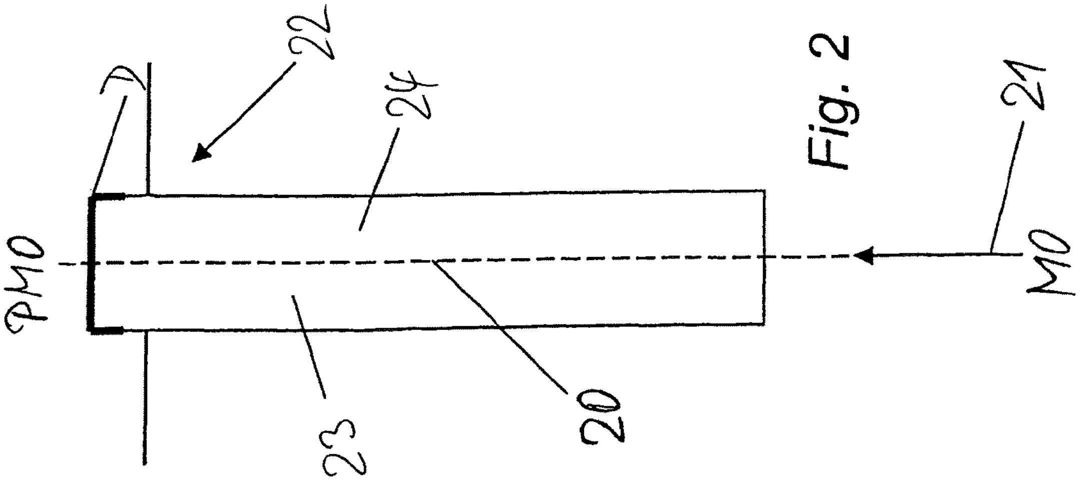
FIG. 2 shows a detector with an inlet gap and a two-dimensional illustration of the transiting ion beam of the detected ions in accordance with a particular set mass.

The mass analyzer is set to a position PM0 for a mass M0 of the sought pollutant, so that the relevant ions theoretically hit the detector D in FIG. 2 centrally, see the dashed line 20 therein as a continuation of the central, relatively long arrow 21, which represents the ion beam from the mass M0. Naturally, the ions enter the detector D with a certain (rate) scatter and in so doing pass through a collector gap 22. In practice, various gaps or slots or openings may be provided at this point. The collector gap referred to is usually the inlet gap of the detector. This function can also be performed by an outlet gap of the mass analyzer. Similarly, an outlet gap in the mass analyzer and a collector gap in the collector may be provided in succession. To simplify matters, only the collector gap 22 is mentioned in this case. What is important in this connection is the possible shadowing of a portion of the ion beam on a gap in this region of the mass spectrometer. The quantity of ions reaching the detector D is shown in FIG. 2 by the two rectangles 23, 24.

Figure 3:
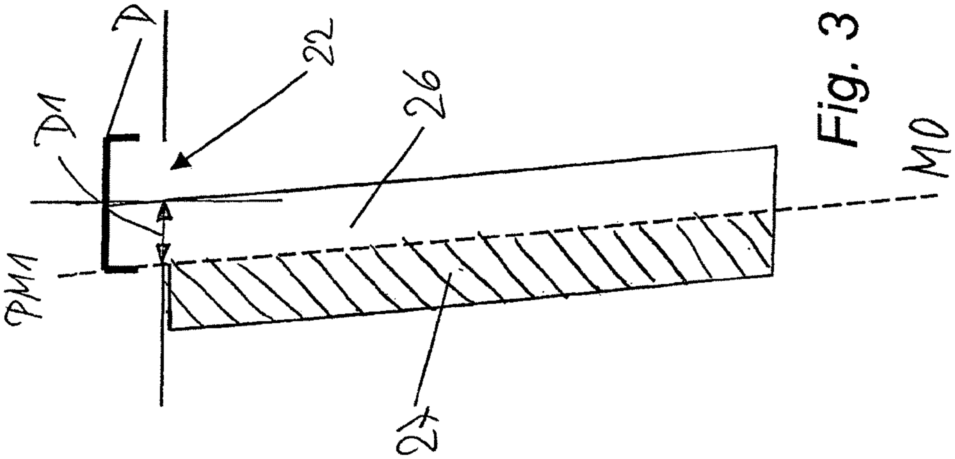
FIG. 3 shows an illustration similar to FIG. 2, but for a different set (adjacent) mass, so that in this case a portion of the ion beam is kept back ("shadowed") from the gap.

The mass analyzer also contains the ion beam from the mass M0. During this, the mass analyzer MA is adjusted by a difference D1 for a different mass, in this case for an adjacent heavier mass position PM1, see FIG. 3. Theoretically, all ions from the mass M0 hit precisely the left-hand edge of the collector gap 22 or of the detector 10. The statistical scatter of the ions gives rise to a distribution such that one portion of the ions reaches the detector D, see rectangular area 26, while the other portion of the ions cannot pass through the collector gap 22, see hatched area 27.

Figure 4:
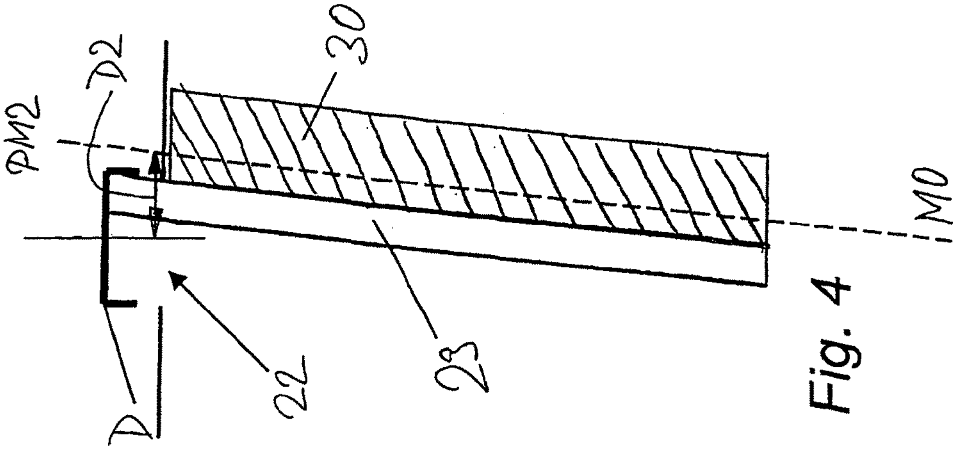
FIG. 4 shows an illustration similar to FIG. 3, with the same ion beam, but with the mass spectrometer set for an opposite adjacent mass, the ion beam being shadowed to an even greater extent.

Next, the mass analyzer is adjusted by an amount D2 for a somewhat lower position PM2 than the mass position PM0, see FIG. 4. In this case, the adjustment is made to the extent that the position PM2 is opposite the position PM1 and even outside of the collector gap 22 or of the detector D. In FIG. 4, a quantity of ions entering the detector D is obtained in line with a rectangle 29 and a quantity of masked-out ions is obtained in line with the hatched rectangle 30.

With reference to the inlet gap 22, the position PM1 is preferably a half gap width next to the position PM0. Usually, the width of the collector gap 22 is tuned to the resolution of the mass spectrometer and is mechanically adjustable. The adjustment by said half gap width to the left then corresponds to the adjustment of the mass position by a half peak width HWHM (=½ FWHM), see also FIG. 5. The amount D1 therefore corresponds to the half gap width and also to the half of the (full) peak width FWHM in this configuration.

In practice, the gap width is set once and then not altered again as far as possible, at any rate not during the determination of the substance. Only the mass which is set on the mass spectrometer is changed, for example by changing the voltage of the electrical sector in a double focusing mass spectrometer. This change can be made very quickly.

The position PM2 in FIG. 4 is situated more than a half gap width next to the position PM0 only for the purposes of illustrating the different adjustment options. Preferably, the position PM2 is set such that it differs from the position. PM0 by the same amount as the position PM1. This is not absolutely necessary for the application of the invention, however.

The adjustment of the mass analyzer for differing mass positions PM1, PM2 also affects the effective resolution of the appliance. Assuming that there is a resolution R of 10 000 for the setting shown in FIG. 2, the masking-out of the half ion beam shown in FIG. 3 results in an increase in the effective resolution R to 20 000. A further shift, for example in a similar manner to FIG. 4, results in shadowing of 75% of the ion beam and accordingly in an effective resolution of R=40 000.

Similarly, the mass transferred in a quadrupole mass analyzer can be adjusted by a portion of the peak width, for example such that the response to an undisturbed peak decreases to 50% of the response in the peak center.

The various masses PM0, PM1, PM2 are selected in succession and repeatedly. The presence of interference for the mass M0 can be derived from the intensities IM1, IM2, measured at the positions PM1 and PM2.

Figure 5:
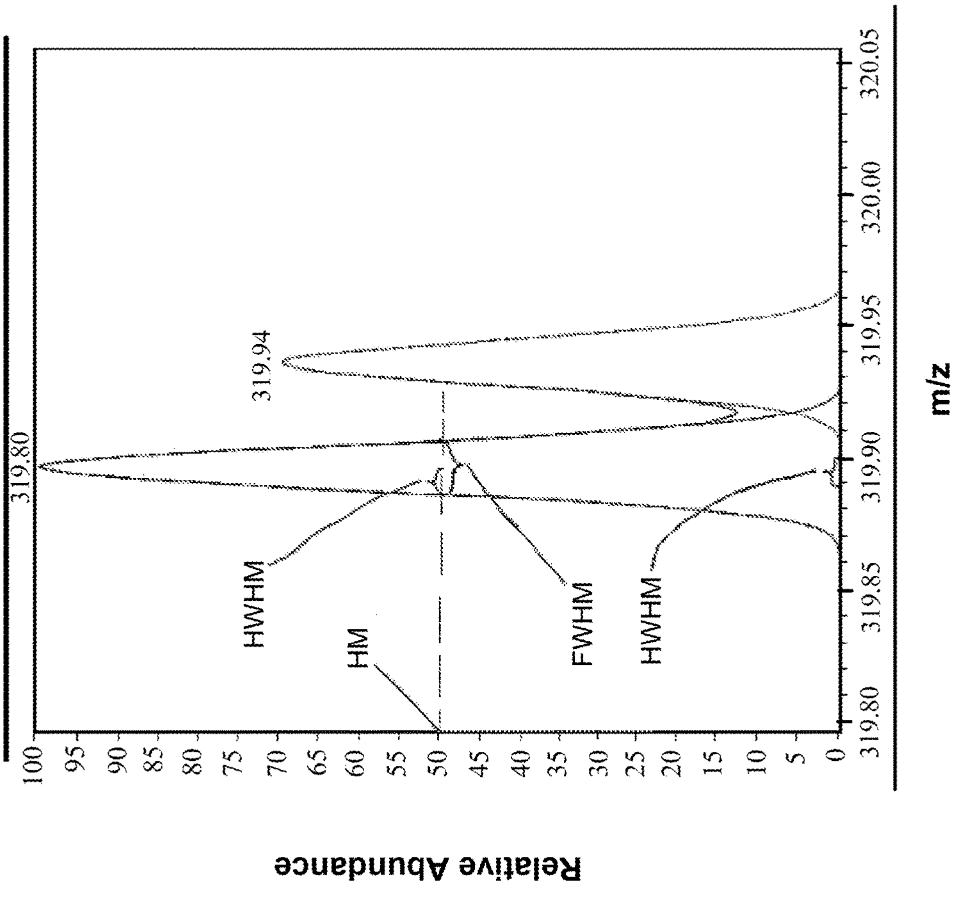
FIG. 5 shows an illustration of adjacent mass peaks with reciprocal interference, namely a tetradioxin and a tetrafuran.

FIG. 5 shows the simulated peaks in a mass scan using two closely adjacent masses, namely m/z=319.90 for (2, 3, 7, 8 tetradioxin), m/z=319.94 for (2, 3, 7, 8-13C tetrafuran—"internal standard" labeled with 13C atoms).

What can be seen is an example of the determination of the half peak width indirectly, namely as peak width (FWHM) at half peak height. Other kinds of determination of the half peak width are possible and also known.

The two peaks coincide with one another in the lower region, so that quantitative determination of a target mass from one of the two masses without corrective measures produces an incorrect result. The ascertained quantity as the area below the peak is greater than the quantity which is actually present, because ions from the adjacent mass are included in the detection of the target mass. In order to avoid or correct this the method according to the invention is used. The adjacent masses M1 and M2 are detected in addition to the examined target mass M0. The results are used for carrying out different computation steps and comparisons. In an approximate division, two essential steps can be distinguished from one another:

a) checking the target mass M0 for interference with adjacent masses, b) quantitatively determining the target mass and the proportion of the pollutant in the sample.

As shown by the illustration in FIGS. 6 to 15, the quantitative determination of a substance involves up to six different masses being detected and being used for further calculations (more are possible but not preferred):

Typically, these are the target mass (quantification mass) QM, with the exact mass position PQ0 (central mass) and the associated, adjacent mass positions PQ1 and PQ2, and the "comparison mass" RM with the associated exact mass position PR0 and the adjacent mass positions PR1 and PR2. In the prior art (cf. EPA 1613), only the ratio of IQ0 to IR0 is used for qualifying the target mass. The quantification is then based on IQ0 alone or on IQ0 and IR0, relative to a calibration standard.

Since the sought pollutant is known, the distribution of the masses with the different isotope contents within said pollutant is also known. The different masses/isotopes have an almost constant statistical distribution relative to one another in the pollutant. In the event of discrepancies between the relative intensities and this distribution, it can therefore be assumed that measurement errors or interference with other masses is/are present.

Figure 6:
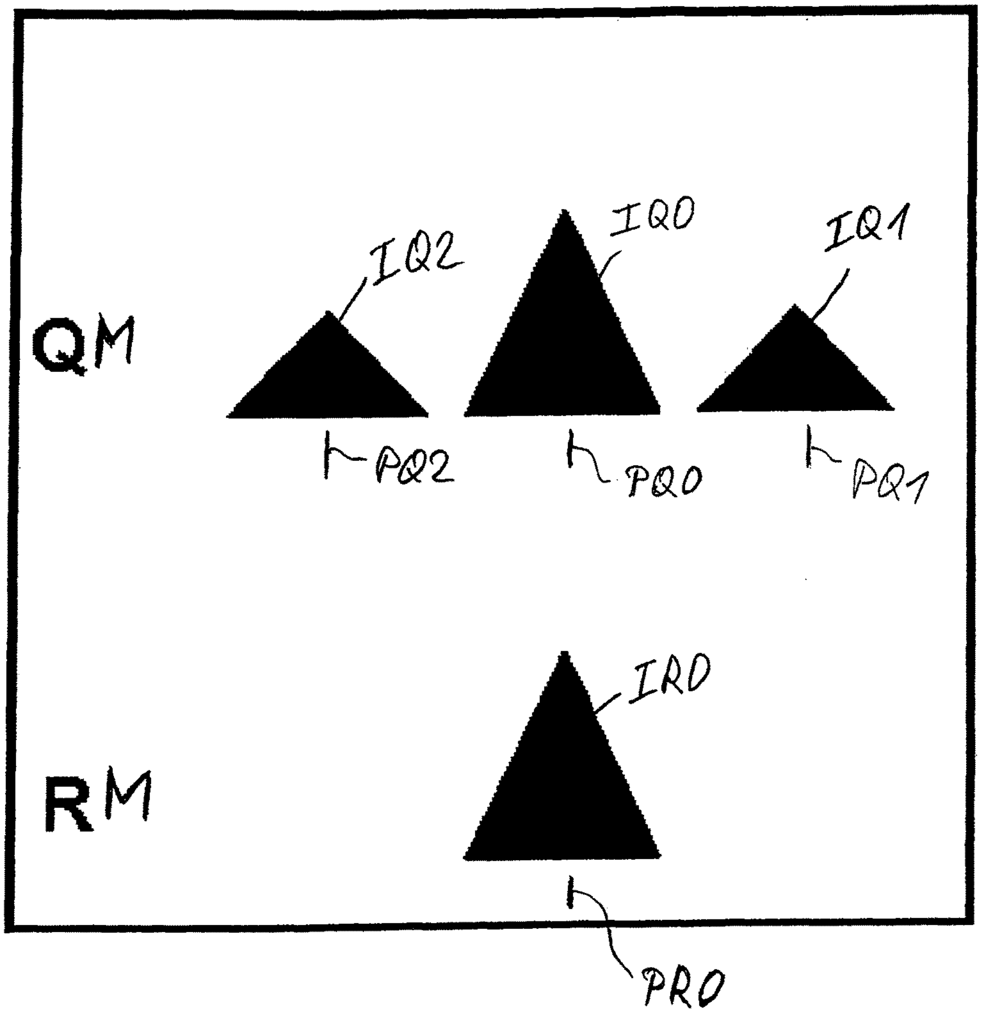
FIGS. 6 to 12 show schematic illustrations of (chromatographic) peaks for the masses Q0 and R0 and of peaks Q1 and Q2 adjacent to the peak at the position PQ0.

As shown in FIG. 6, a simple method is used to detect the (total of four) intensities IQ0, IQ1, IQ2 from QM and IR0 from RM. It is possible and even simpler to measure without IQ0. A comparison is performed between the two intensities at the positions PQ1 and PQ2, which are preferably at the same distances from the position PQ0. If the intensities are essentially the same, it is assumed that there is no interference. The intensity IQ0 can then be calculated from IQ1, IQ2 or from both, as desired by the user. In the simplest case, for which the expected intensities of an interference-free peak are=2×IM1=2×IM2=IM0, the most reliable calculation of IQ is: IQ0=IQ1+IQ2. Good results can also be attained, with IQ0=2×IQ1 or IQ0=2×IQ2, however.

An additional check for interference can be attained by comparing the intensities IQ1 and IQ2 with the intensity IR0 of the comparison mass RM. Naturally, it is also possible to carry out the conventional approach for comparing measured or calculated values IQ0 to IR0 (and this approach must be carried out if the method disclosed in EPA 1613 is to be followed). If no interference is indicated, the target substance can be quantified from the intensity IQ0 alone or from IQ0 and IR0 together.

FIG. 6 shows the (chromatographic) peak areas for the mass intensities IQ1 and IQ2 as triangles of the same size so as to illustrate interference which is not present. Merely for the purpose of simplification, the triangle for IQ0 is the same size as that for IR0.

The experiment may involve the measurement of an internal standard for a similar compound (for example the target substance, in which ail carbon atoms have been replaced by 13C, the heavier and usually less frequent carbon isotope) which is considered to be usually free of interference. In this case, it would be sufficient to measure the intensities of the isotope peaks in the internal standards which correspond to QM and RM in the target substance. The results are used for calculating the relative isotope rate. This allows the content of the target substance in the sample to be ascertained (usually on the basis of a previously performed quantification calibration) and for the purpose of ascertaining a possible compliance with limit values in the case of pollutants. Finally, all validated, measured data can be added for the quantification. This improves the overall accuracy of the calculation.

Figure 7:
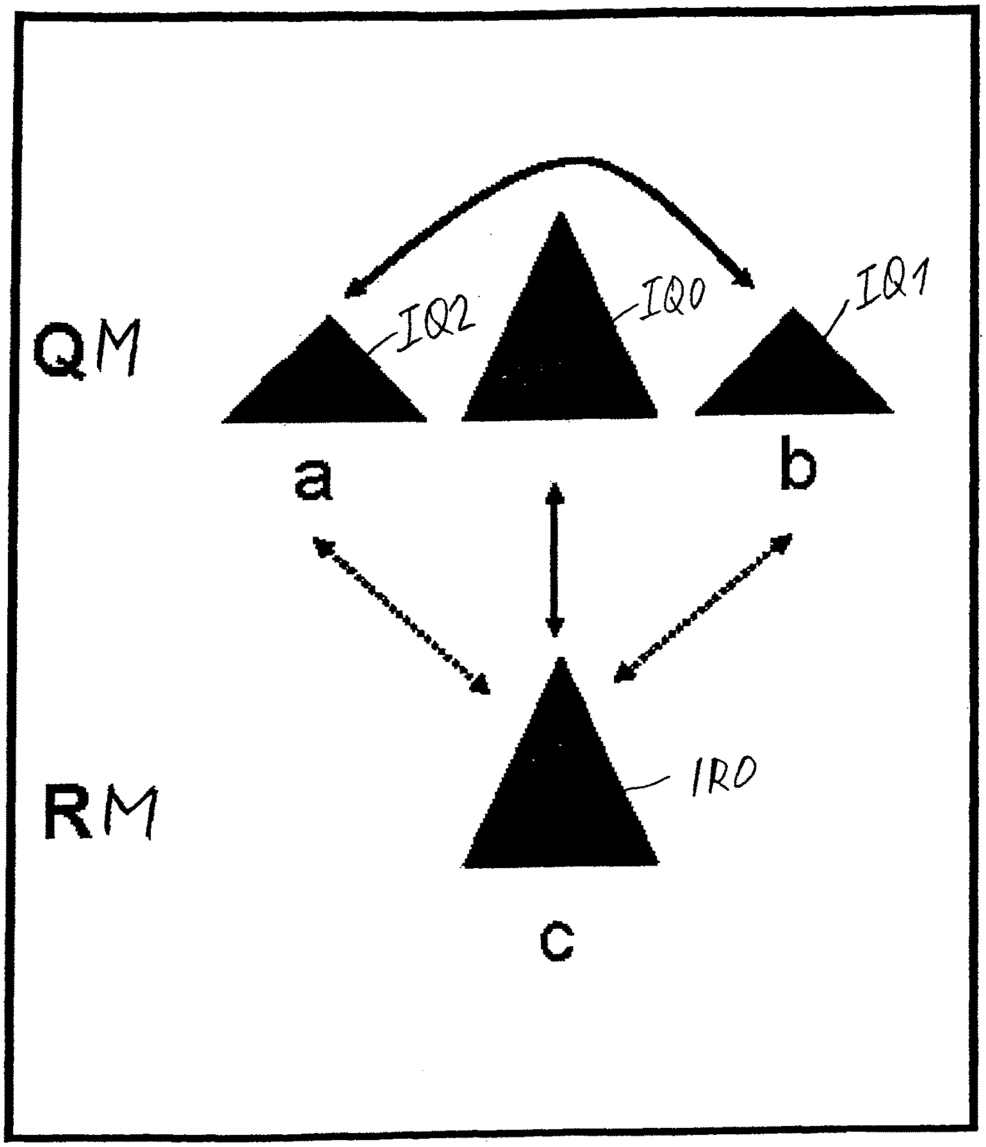

FIG. 7 shows the possible relationships between the four masses shown in FIG. 6. The following ratios can be calculated and assessed:

a) IQ1 to IQ2 (triangular areas b/a); if the resultant number is significantly different than 1, there is interference;

b) IR0 to IQ1 (triangular areas c/b) and IR0 to IQ2 (c/a); if these two results are different, there is interference;

c) IR0 to the sum of IQ1+IQ2 (c/(a+b)); the resultant ratio is intended to match the known isotope pattern of the known pollutant if there is no interference.

Similar and equivalent calculations can easily be derived from the teachings of these examples.

Levels of significance can be determined from principles of ion statistics or can be prescribed by experienced users. By way of example, a typical, expected measurement accuracy for the intensities for the instrument is +/−10%. In this case, a ratio of 1.1 to 0.9=1.22 with a deviation of less than 25% from the basic value would not be regarded as an indication of interference. If the expected intensity accuracy is +/−20%, for example when the value is closer to the detection limit, a ratio of approximately 1.5 would still be acceptable.

Figure 8:
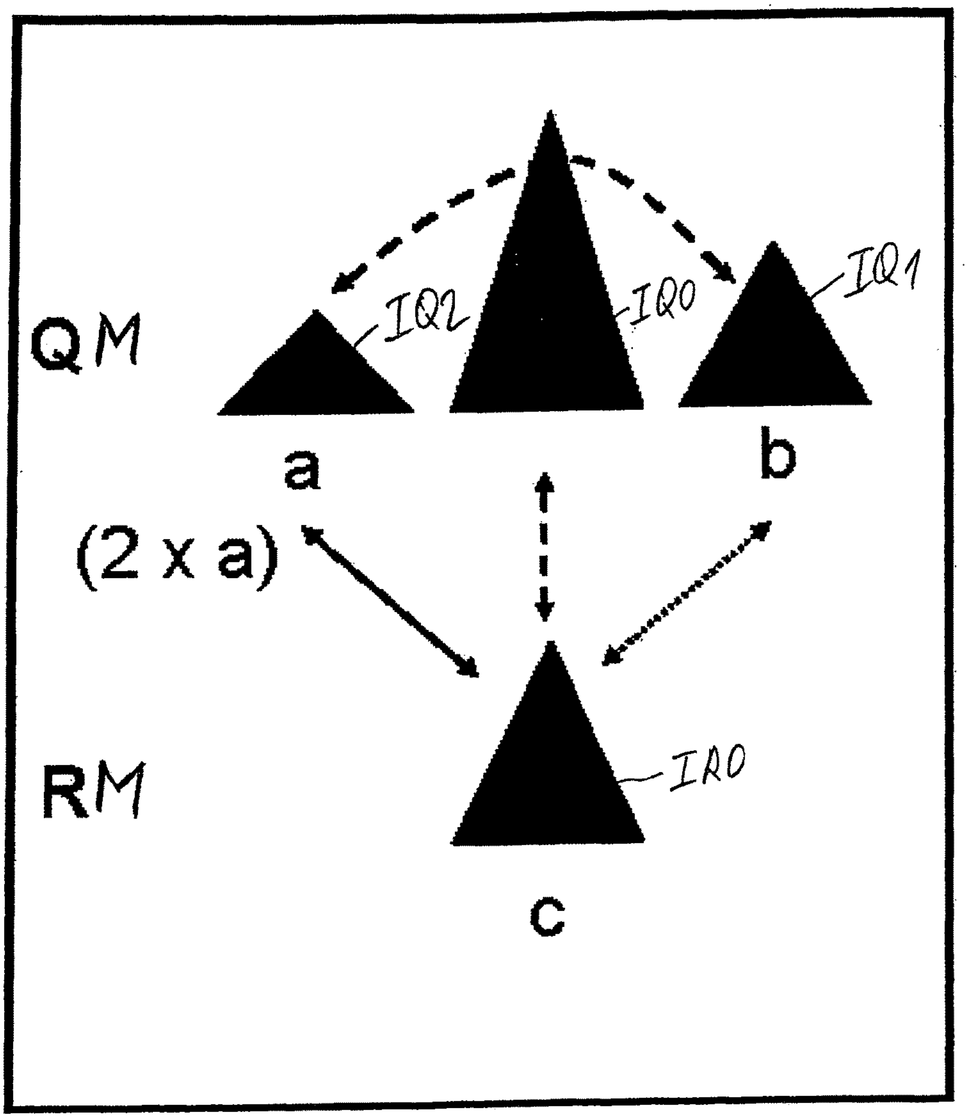

FIG. 8 shows interference. As indicated above, the different masses are detected and the results compared with one another. It is possible to see the larger area b for IQ1 in comparison with the smaller area a for IQ2. Accordingly, IQ0 at the mass position PQ0 has interference on the right at the position PQ1. The ratio of IQ2 to IR0 may therefore be in order, while the ratio of IQ1 to IR0 does not correspond to the statistical value. Furthermore, the ratio IQ1 to IQ2 is significantly different than 1. Finally, the ratio of IQ0 to IR0 is also different than the expected value. Assuming that interference is present only on one side, namely at the position. PQ1, the other value, that is to may IQ2, can be used for the quantification. The absence of interference for IQ2 can be assumed if the ratio of 2×IQ2 to IR0 corresponds to the expected (statistical) isotope ratio.

Figure 9:
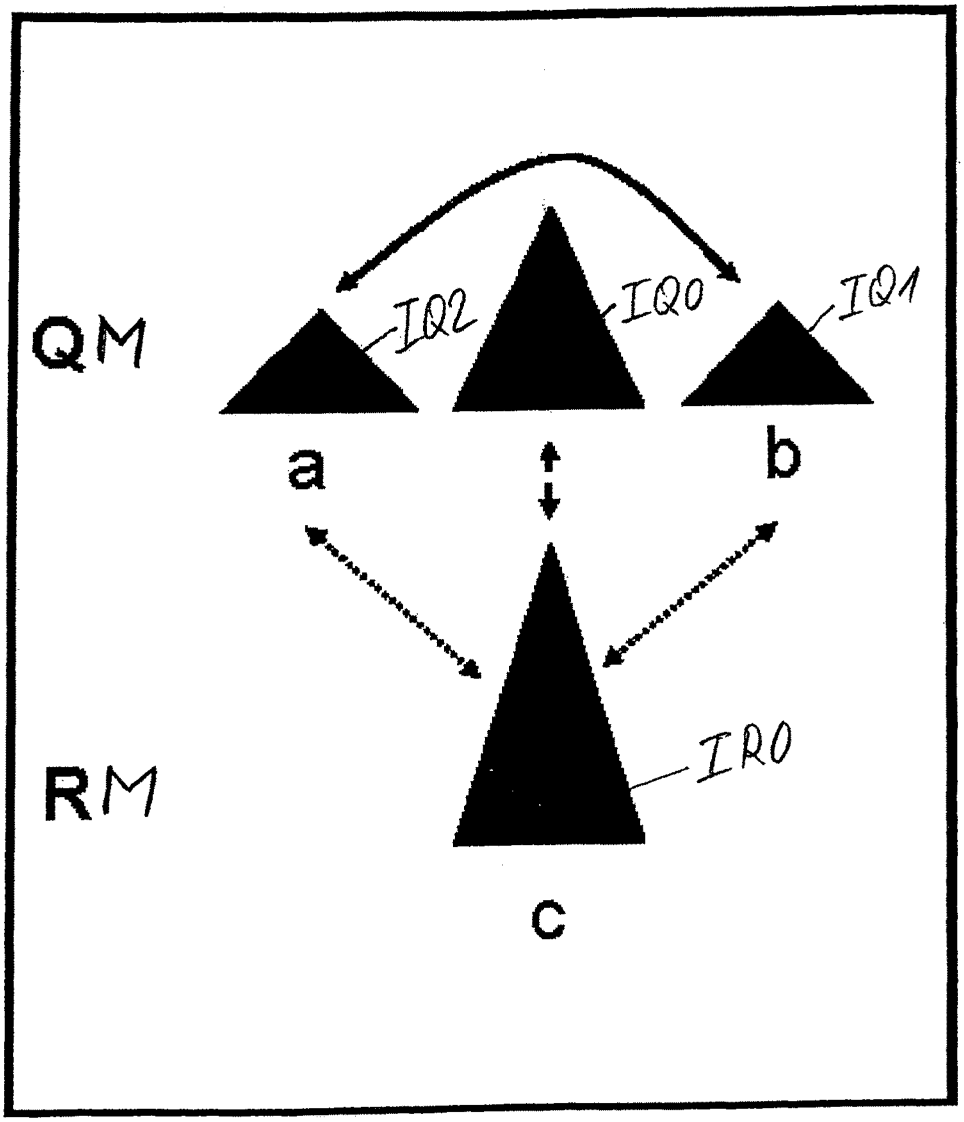

The mass AM may also be influenced by interference. This case is illustrated in FIG. 9. IR0 (size of the triangle c) therein is significantly above the value which can be expected statistically. By contrast, the ratio of IQ1 to IQ2 is correct, which means that there is probably no interference for IQ0 and the value can be used for quantification. IQ0 can be adopted from direct measurement or by calculation from IQ1 and IQ2, as described above.

Figure 10:
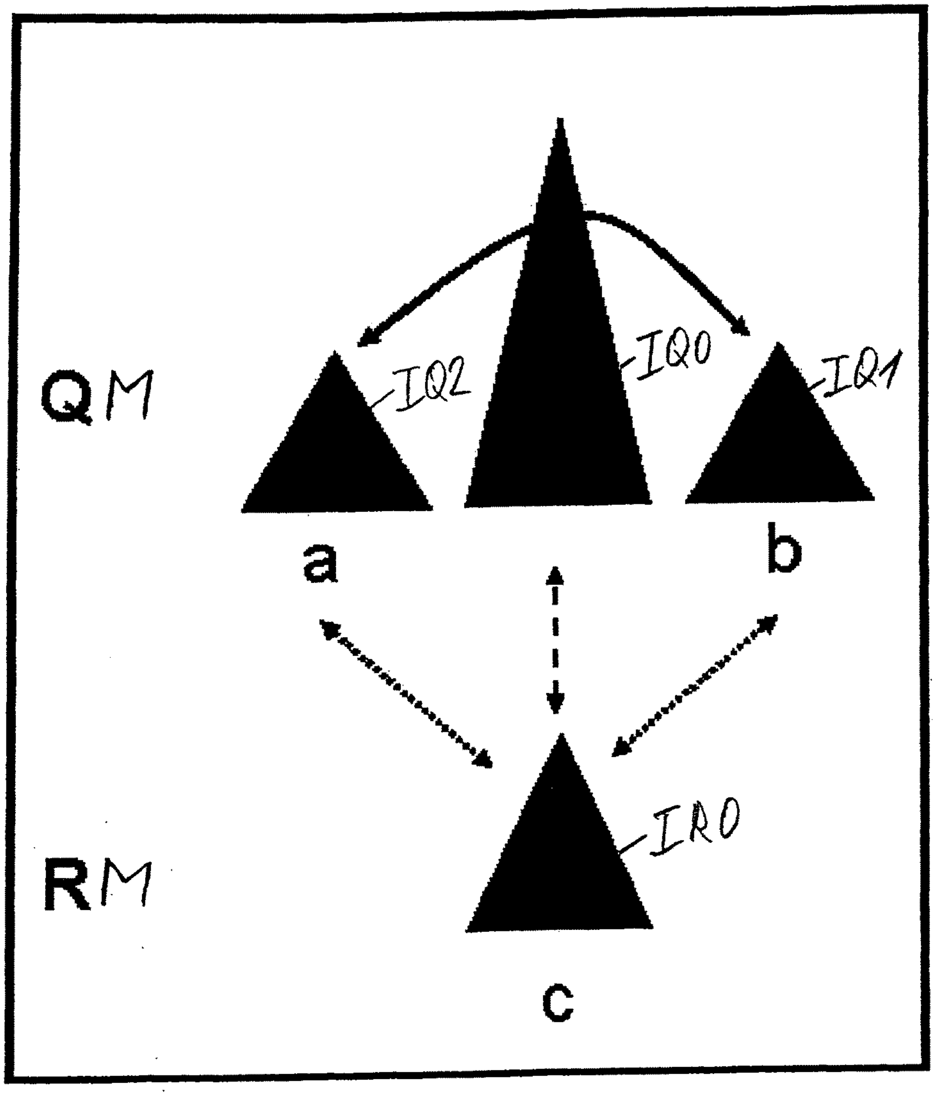

Further possible measurement results are shown in FIG. 10. IQ0 is much larger than could be expected statistically. However, there is no imbalance, which means that IQ1 and IQ2 are approximately the same. The fact that there is interference therefore results only from comparison of the intensities for QM with the intensities for RM.

Figure 11:
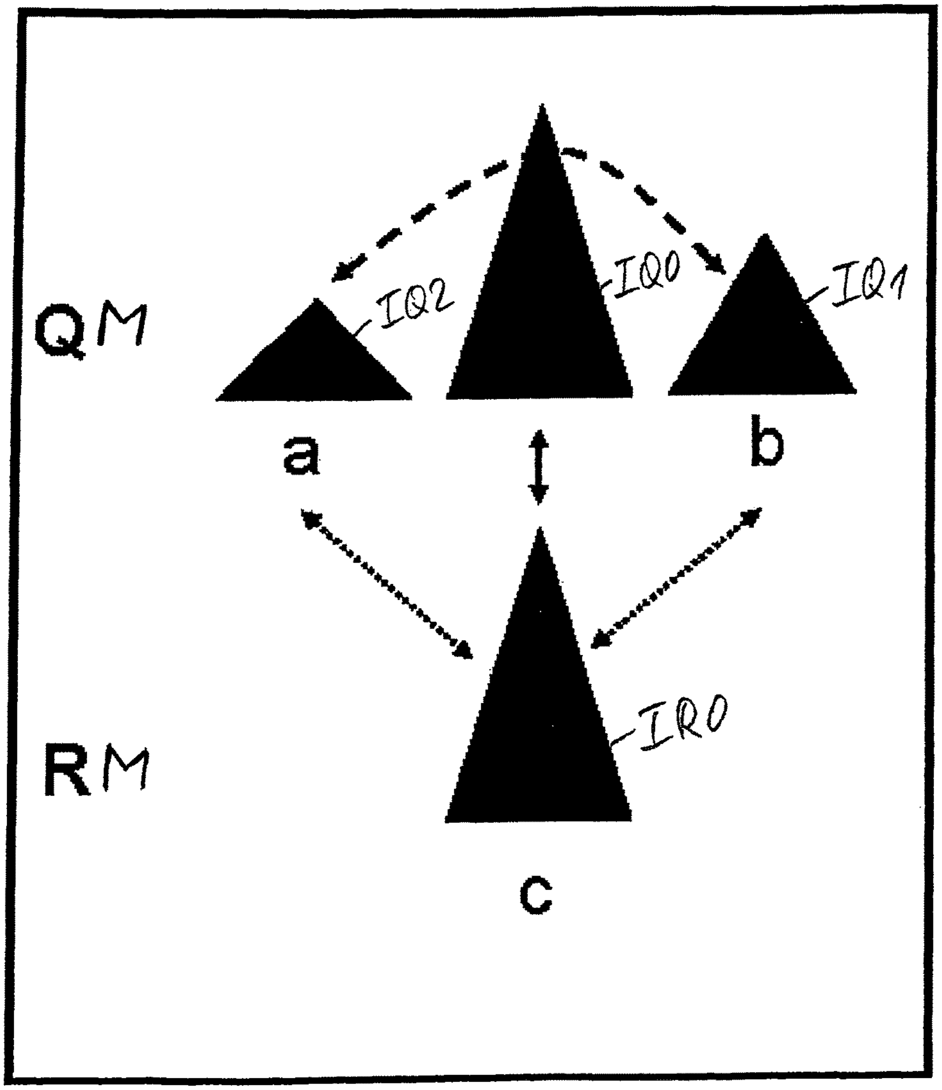

Interference relating to a plurality of masses is shown in FIG. 11. None of the ascertained ratios meets the expectation, this also applying to IQ2 to IR0 (a/c). Assuming that the smaller values are not subject to interference, the measured value IQ2 (the area a) could be used for quantitative determination.

Figure 12:
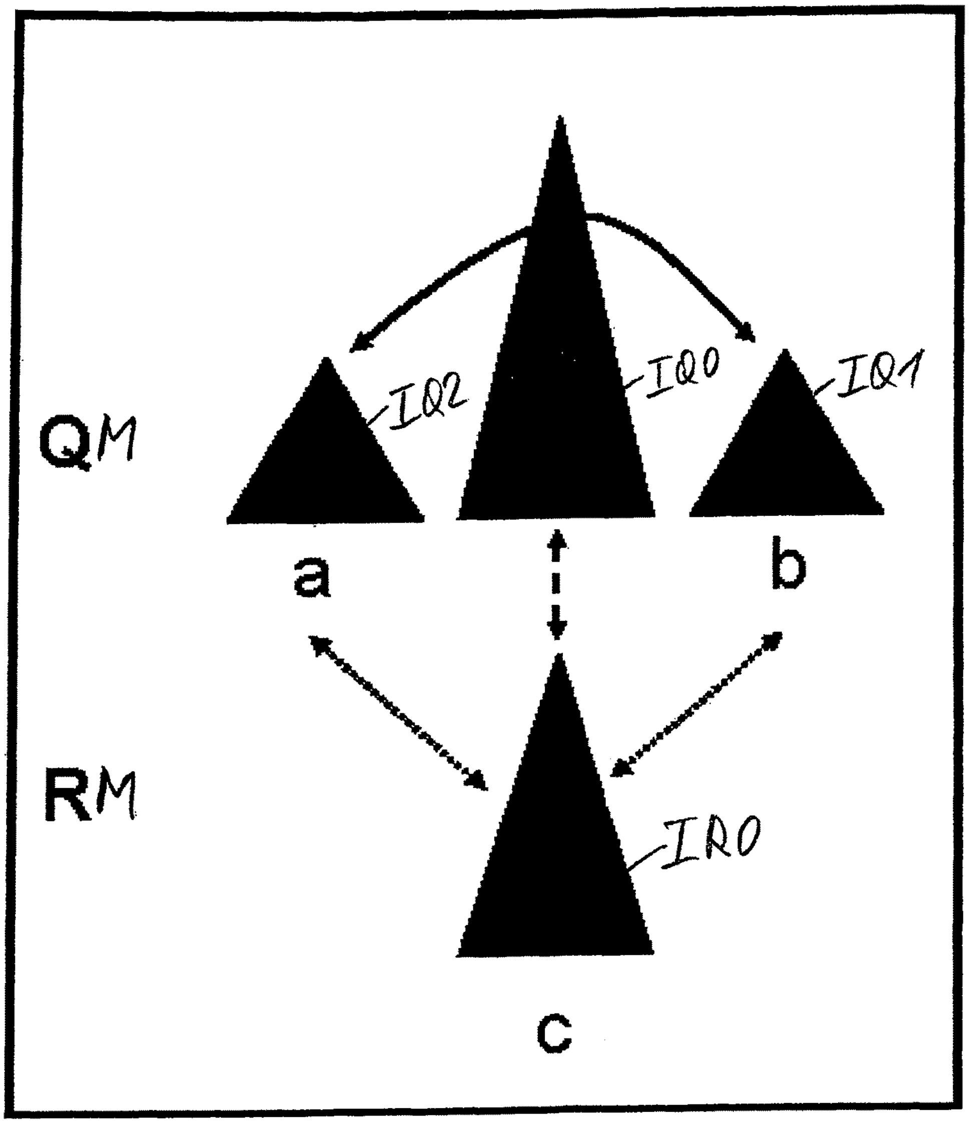

A special case is also shown in FIG. 12. In this instance, there is interference on the values IQ1 and IQ2 and on the measured IQ0. The associated areas a, b and c, like the metrologically or computationally ascertained area for IQ0, are larger than could be expected statistically. Quantitative determination of the pollutant is not possible with the measurements. In the unfavorable—or improbable—case, IQ1 is approximately as large as IQ2, which means that no interference is assumed for the measured values and they are used for the quantification, unless a comparison with IR0 is performed by RM at the position PR0.

The time or quantity of samples available for the measurement is usually highly limited. This applies particularly under chromatographic conditions, with GO peaks which are only a few seconds wide, for example. This limits the measurement cycles to as few masses as possible in order to allow maximum dwell times for the detected masses. Secondly, the determination of further masses can avoid the risk of unrecognized or quantification-disturbing interference. This is discussed in the section below.

Figure 13:
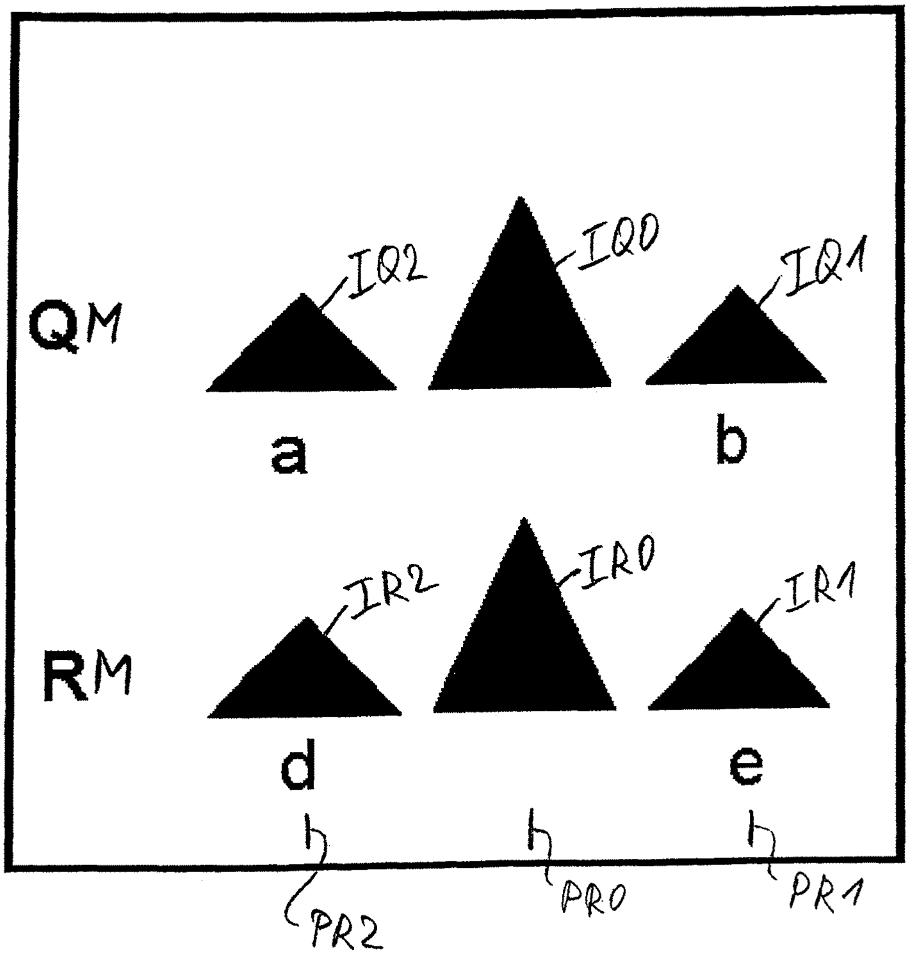
FIGS. 13 to 15 show illustrations similar to FIGS. 6 to 12, but with the addition of adjacent masses R1, R2 to the mass R0.

In the example in FIG. 13, six masses are detected, with the intensities IQ0, IQ1, IQ2 for the quantification mass and the corresponding group of three containing the intensities IR0, IR1, IR2 for the comparison mass.

Figure 14:
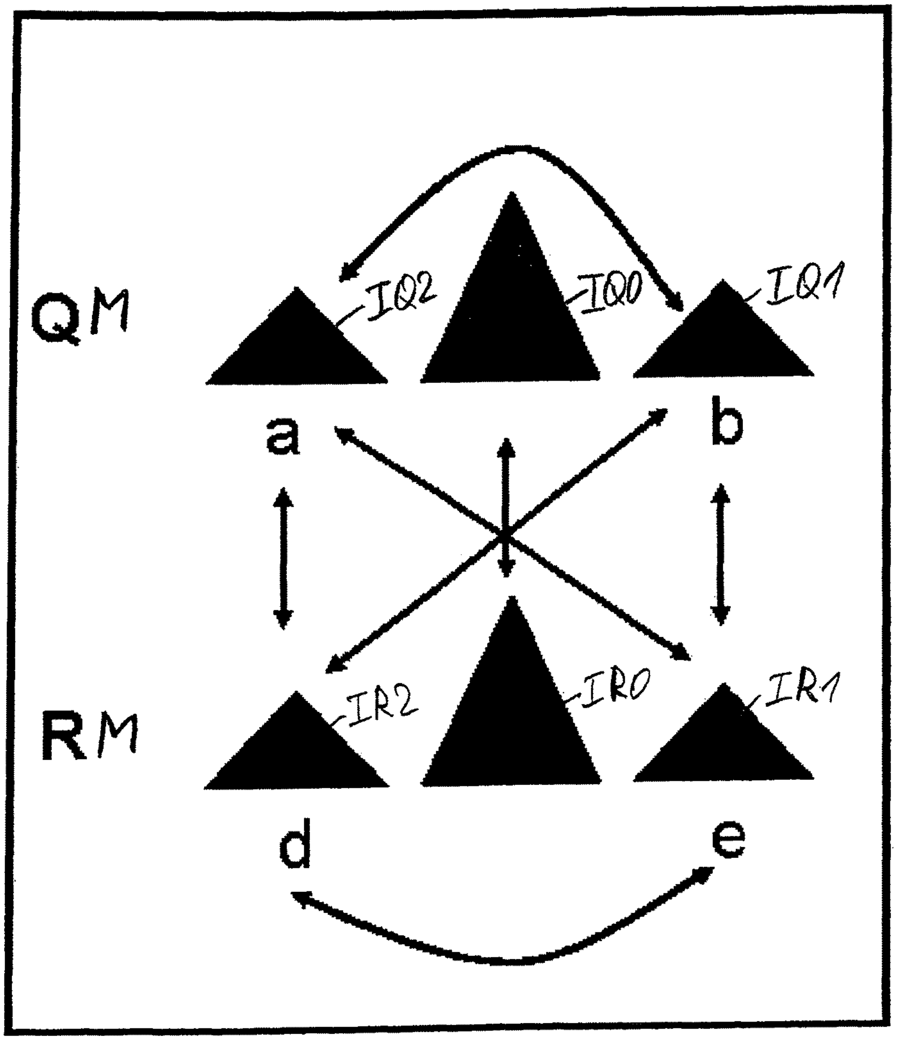

The additional values IR1 and IR2 allow further ratios to be calculated and compared with the values which can be expected statistically, for example the ratios of the areas a to d and b to e. This would allow the situation shown in FIG. 12 to be checked in more detail. It is also possible for sums to be related to one another, for example the areas (d+e)/(a+b). The setpoint values thereof can be compared with additionally measured internal standards. FIG. 14 shows an illustration of measured values with which no interference is associated.

Figure 15:
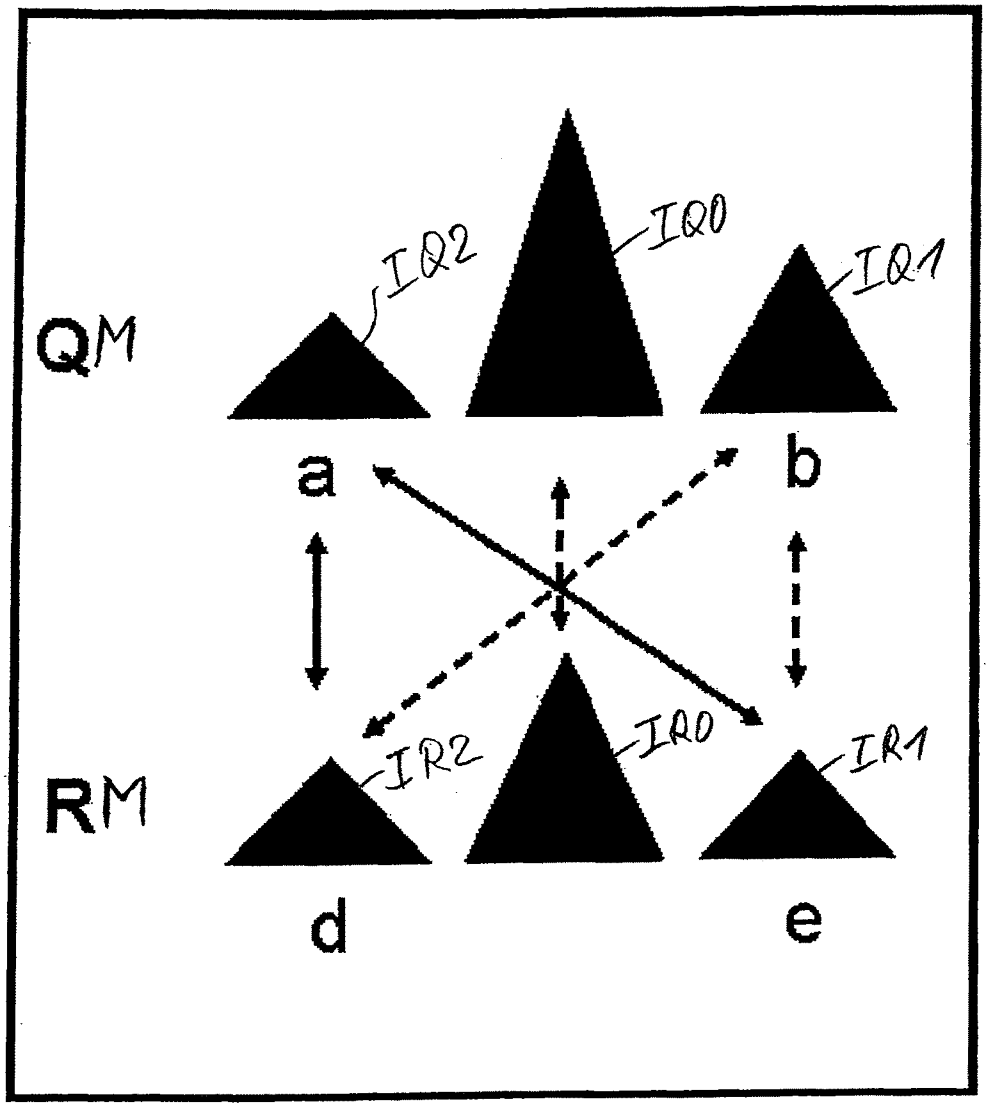

FIG. 15 in turn shows the instance of interference for IQ0, specifically in the right-hand half thereof, that is to say with reference to IQ1. The ratio of IQ2 to IR2 (area a to d), which, with knowledge of the ratio to the overall intensity, can be used for quantification, corresponds to the value that can be expected.

In FIGS. 7 to 15, some of the triangular areas are linked by arrows. Each arrow represents the calculation of a ratio for the associated areas a to e. Dotted arrows indicate interference, while continuous arrows mean that no interference can be assumed.

It is worth mentioning that for a prescribed overall detection time—at least for the case of no interference—in a method in which IM1 and IM2 are measured instead of IM0, only half of the total number of ions detected are used for the calculation. Better ratio values can be ascertained if the measurement of the target mass and the intensity IM0 thereof is not omitted. In other words: additional information and certainty can be obtained with minimal involvement.

What is claimed is:

1. A method for the quantitative determination of a chemical substance S contained in or derived from a sample using a mass spectrometer having at least one detector, comprising steps of:

providing an ion beam for detection that is free from passage through a split ion detector;

operating the mass spectrometer in a non-scanning, alternate peak detection mode;

setting the mass spectrometer to detect using a common detector at least masses SM1 and SM2, so that each of the masses SM1 and SM2 is detected at least once, wherein the masses SM1 and SM2 are fictitious neighboring masses which are at defined distances D1 and D2 from a central mass CM, wherein the mass CM is a mass of the substance S with a particular isotope content, wherein SM1 is heavier than CM and SM2 is lighter than CM, wherein the masses SM1 and SM2 are not further masses of the substance S, and wherein the distances D1 and D2 are each shorter than a peak width for the mass CM at prescribed resolution;

wherein substantially a full beam of ions hits an ion detector when the system is set to CM and only part of the full beam of ions reaches the detector when set to SM1 or SM2;

evaluating from the measured intensity values for masses CM, SM1 and SM2 whether there is interference from the mass CM with other masses;

in reliance of the result of the interference evaluating step, determining the quantity of the mass CM by a selected one of: (i) setting the mass spectrometer for the mass CM and detecting the mass or (ii) by means of calculation from the measured intensity values for the masses SM1 and SM2.

2. The method as claimed in claim 1, wherein each of the distances D1, D2 corresponds to the half peak width HWHM of the mass CM.

3. The method as claimed in claim 1, wherein the mass spectrometer is alternately set to detect using a common detector at least the masses SM1, SM2 and CM, so that each of the masses SM1, SM2, CM is detected at least once.

4. The method as claimed in claim 1, wherein the mass spectrometer is alternately set to detect using a common detector at least for the neighboring masses SM1, SM2 of the mass CM and for the mass RM, so that each of the masses SM1, SM2, RM is detected at least once, wherein the mass RM is a mass of the substance S and has a different isotope content than the mass CM, and wherein a measured intensity value for the mass RM is also used for evaluating the interference with the mass CM.

5. The method as claimed in claim 1, wherein components of the sample or a conversion product of the sample are temporally resolved using a chromatographic method prior to the mass spectrometry analysis.

6. The method as claimed in claim 5, wherein the chromatographic method is a gas chromatography method.

7. The method as claimed in claim 1, wherein the mass spectrometer comprises a sector field mass spectrometer, a double-focusing mass spectrometer, or a quadrupole mass spectrometer.

8. The method as claimed in claim 7, wherein the mass spectrometer is set to detect the various masses by adjusting an electrical field.

9. The method as claimed in claim 1, wherein the mass spectrometer includes only a single detector having a detector inlet gap.

10. The method as claimed in claim 1, wherein the mass spectrometer includes at least one of the following ion sources: a) an electron impact ion source, b) a chemical ionization ion source, c) a field ionization ion source, d) a field desorption ion source, e) a fast atom bombardment (FAB) ion source, f) an atmospheric pressure ionization (API) ion source, g) a laser desorption or matrix-assisted laser desorption ionization ion source, h) a photoionization ion source, i) an electrospray ion source, j) a thermospray ion source, k) a plasma desorption ion source, l) a secondary ion (SIMS) ion source, m) a thermal desorption ion source, and n) an inductively coupled plasma (ICP) ion source.

11. The method as claimed in claim 1 wherein the width of the detector substantially matches the width of the ion beam.

12. The method as claimed in claim 1 wherein the width of the ion beam is the same for each of the settings CM, SM1 and SM2.

13. The method as claimed in claim 1 where possible interference ions could enter the detector when setting the MS to the defined distances D1 or D2.

* * * * *